United States Patent [19]

Albert

[11] Patent Number: 4,573,274
[45] Date of Patent: Mar. 4, 1986

[54] METHOD APPARATUS OF MEASURING AXIAL PARALLELISM OF ROLLER PAIRS

[76] Inventor: Hans Albert, Kunigundbergasse 626, A-2380 Perchtoldsdorf, Austria

[21] Appl. No.: 537,274

[22] Filed: Sep. 29, 1983

[51] Int. Cl.$^4$ .................................................. G01C 9/12
[52] U.S. Cl. ........................................ 33/182; 33/333; 33/391
[58] Field of Search .................. 356/138; 33/182, 349, 33/375, 387, 388, 174 S, 333, 391, 301

[56] References Cited

U.S. PATENT DOCUMENTS 3,947,970  4/1976  Lesure ................................... 33/182

FOREIGN PATENT DOCUMENTS 823134  11/1951  Fed. Rep. of Germany ........ 33/182

Primary Examiner—William D. Martin, Jr.
Attorney, Agent, or Firm—Karl F. Ross; Herbert Dubno

[57] ABSTRACT

To determine the deviation of two juxtaposed cylindrical rollers from parallelism of their axes, the angle included between a reference direction (e.g. vertical) and a line tangent to the roller surfaces is measured and the process is repeated at another location axially spaced from the first one. The method is particularly applicable to calendering rollers in paper-making machinery or the like.

2 Claims, 3 Drawing Figures

METHOD APPARATUS OF MEASURING AXIAL PARALLELISM OF ROLLER PAIRS

FIELD OF THE INVENTION

My present invention relates to a method of determining the deviation, if any, of the axes of two juxtaposed cylindrical rollers from each other and measuring the degree of such deviation.

BACKGROUND OF THE INVENTION

Instances exist, e.g. in the treatment of paper or other sheet material by vertically superposed calendering rollers, where it is important to maintain the axes of such rollers as parallel as possible to each other. Conventional means for checking on their parallelism, e.g. optically with the aid of a theodolite, are cumbersome and at times difficult to implement, as where parts of the roller pair are obscured by a machine frame supporting same.

OBJECT OF THE INVENTION

Thus, the object of my present invention is to provide a method of efficiently determining axial deviations of such a roller pair.

SUMMARY OF THE INVENTION

I realize this object, in accordance with my present invention, by first measuring the angle included between a reference direction and a line that is tangent to the rollers in a first plane substantially peripendicular to their axes, thereafter repeating that measurement in a second plane parallel to the first plane and separated therefrom by a predetermined distance, and calculating an angular divergence from the two angles so measured, taking the distance between the planes into account. This angular divergence may be regarded as the inclination of one axis relative to the plane defined by the other axis and the reference direction.

That reference direction preferably lies in a plane which nominally includes the two rollers axes and which will be vertical in the case of the aforementioned calendering rollers. The reliance on a vertical reference direction enables the measurement of the tangential angles with the aid of a pendulum.

BRIEF DESCRIPTION OF THE DRAWING

The above and other features of my invention will now be described in detail with reference to the accompanying drawing in which.

SPECIFIC DESCRIPTION

Figure 1:
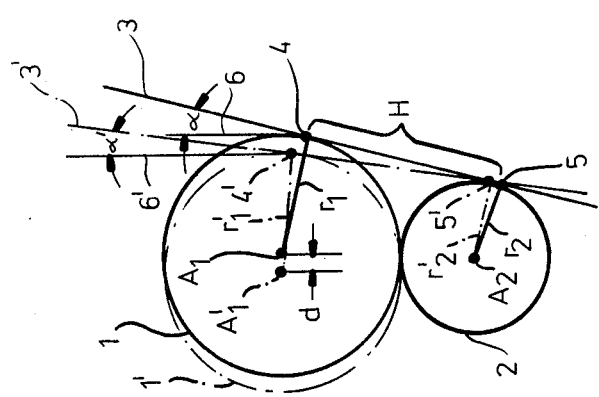
FIG. 1 diagrammatically illustrates the principles underlying my present method.

FIG. 1 shows two contacting circles 1 and 2 representing the cross-sections of a pair of vertically superposed rollers as taken in a particular plane substantially transverse to their axes $A_1$ and $A_2$. A circle 1', indicated in phantom lines, is centered on a point $A_1'$ laterally shifted by a small distance d from point $A_1$ to indicate the cross-section of the upper roller in another vertical plane axially separated from the one containing the circle 1. The two vertical planes are presumed to be exactly perpendicular to axis $A_2$ so that circle 2 represents the cross-sections of the lower roller in both planes.

In the first vertical plane, a line 3 is tangent to circles 1 and 2 at respective points 4 and 5 separated by a distance H. A similar tangent 3' touches the circles 1' and 2 in the second plane at respective points 4' and 5'. Tangent 3 includes a small angle $\alpha$ with a vertical reference line 6; a still smaller angle $\alpha'$ is included in this distance between tangent 3' and the vertical reference direction represented by a line 6'. The radii of the upper roller perpendicular to tangents 3 and 3' in points 4 and 4' have been respectively designated $r_1$ and $r_1'$; the corresponding radii of the lower roller are marked $r_2$ and $r_2'$. With the small angles involved, points 4' and 5' may be considered spaced apart by the same distance H as points 4 and 5. Furthermore, the deviation d substantially equals the difference between the sines of angles $\alpha$ and $\alpha'$ and can thus be written as $$d = H(\sin \alpha - \sin \alpha') \approx H(\alpha - \alpha').$$

The foregoing equation applies, of course, only when $\alpha$ and $\alpha'$ are measured in radians; if they are measured in degrees, the result will have to be multiplied by a conversion factor $\pi/180$ in order to yield the linear (horizontal) deviation d in the same units of length (e.g. centimeters) in which the distance H is measured.

Figure 2:
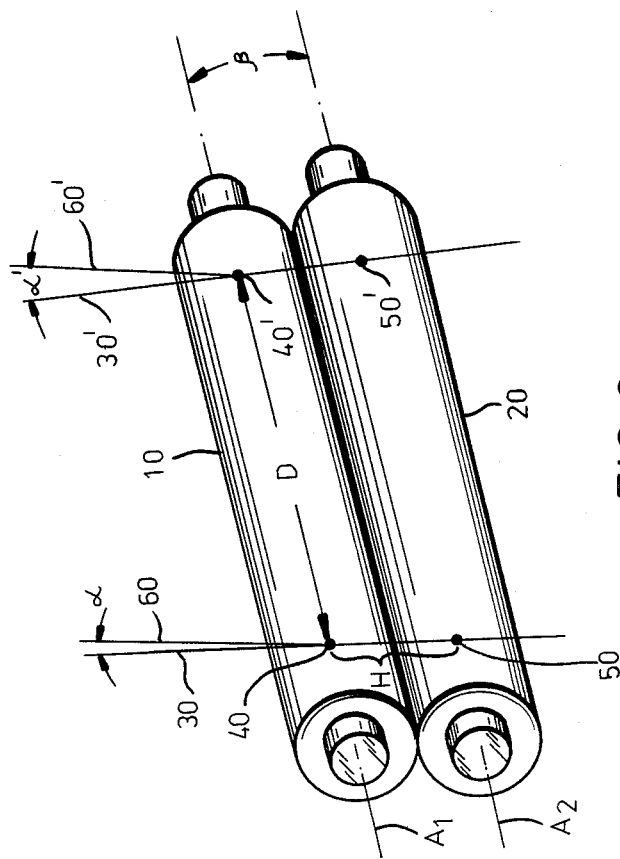
FIG. 2 is a perspective view of a pair of vertically superposed calendering rollers to which my invention is applicable.

The angular divergence $\beta$ of the axes $A_1$ and $A_1'$ is given, accurately enough, by d/D where D is the axial distance between the two measuring planes as illustrated in FIG. 2 for two calendering rollers 10, 20 of equal diameter which are journaled in bearings not shown. No conversion factor will be needed if the divergence $\beta$ is to be read in the same units (degrees or radians) as the measuring angles $\alpha$ and $\alpha'$. FIG. 2 further shows tangential lines 30 and 30' touching the rollers 10 and 20 at respective points 40, 40' and 50, 50' separated by distance D. In this instance the second angle $\alpha'$ is larger than the first angle $\alpha$, indicating a divergence of the axes toward the right.

Figure 3:
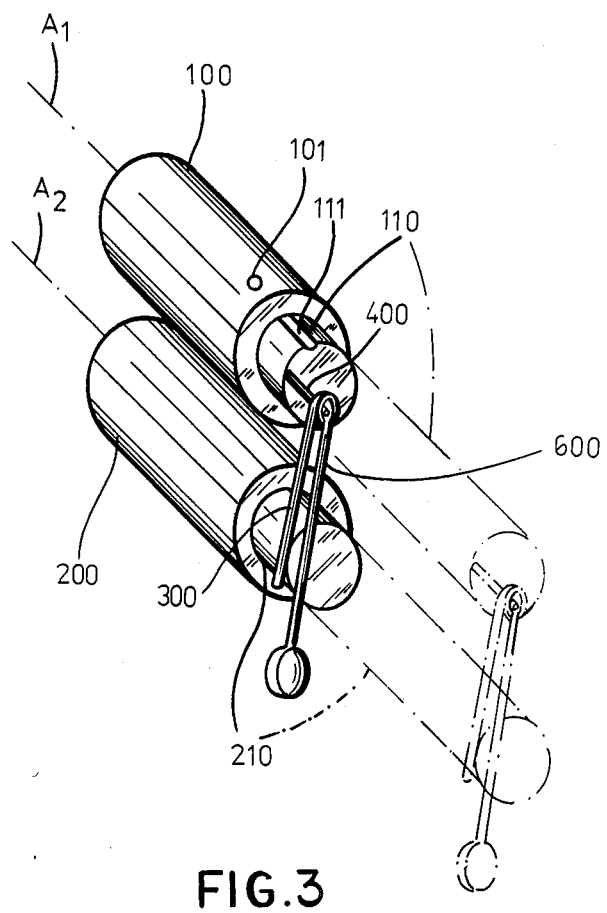
FIG. 3 is a partial perspective view of a similar roller pair equipped with telescoped extention rods which facilitate the performance of the two angle measurements in axially separated vertical planes.

In FIG. 3 I have illustrated two similar calendering rollers 100 and 200 provided with respective telescoped extensions in the form of cylindrical rods 110, 210 of smaller diameter. The upper extension rod 110, held against rotation relative to roller 100 by having a longitudinal groove 111 engaged by a pin 101 of that roller, is provided at the periphery of its front or free end face and in its horizontal midplane with an axially oriented pin 400 on which a measuring or gauging rod 300 and a pendulum 600 are independently pivoted. In a first measuring position, illustrated in full lines, the extension rods 110 and 210 project but slightly from their respective rollers 100 and 200, with the lower rod 210 leading just enough to be peripherally contacted by the measuring rod 300 but with pendulum 600 free to swing in front of the free end face of the lower extension rod in a plane close enough to that of the gauging rod 300 to enable a visual reading of angle $\alpha$ on a nonillustrated protractor which may be affixed to that rod or to the pendulum. The two extension rods are then further extracted, by the predetermined distance D referred to above, into a second position indicated in phantom lines in which angle $\alpha$ is read. The inclination of the gauging rod 300 has been exaggerated in these positions for the sake of clarity. Although rod 300 will not be exactly tangent to shaft 110 in both measuring positions, the error will usually be negligible; thus the linear deviation d and the angular divergence $\beta$ can be calculated in the aforedescribed manner.

The described operation can also be performed automatically, with the extension rods 110 and 210 suitably indexed in their retracted and extended positions and with photoelectrical or electronic measurement of the angles of inclination of the gauging rod 300, the values so obtained being fed to a calculator operating according to the formula given above.

In principle, of course, the method of my invention is applicable to the ascertainment of axial divergences in any direction, not just horizontally as with the arrangement just described. A possible divergence in a vertical plane, however, can be detected by conventional means such as a spirit level so that the choice of a vertical reference direction has special significance.

I claim:

1. A method of determining the deviation of two respectively upper and lower cylindrical rollers from parallelism of their axes, wherein said rollers at corresponding first ends thereof have each an axial telescoped extension rod which has a free end face and is axially displaceable relative to the associated one of said rollers, the upper extension rod carrying at its free end face adjacent the perimeter thereof on a horizontal radius a pivot pin extending parallel to the axis of said upper roller and vertically swingably supporting a gauging rod and a pendulum, with said pendulum being disposed farther from said free end face of said upper extension rod than said gauging rod, comprising the steps of:

(a) locating said extension rods in respective first telescoped positions, with the upper extension rod having its free end face spaced farther from said first end of said upper roller in the axial direction than said lower extension rod to a degree permitting free swinging of said pendulum past said free end face of said lower extension rod but dictating tangential engagement of said gauging rod with the peripheral surface of said lower extension rod, and measuring the angle included between said gauging rod when the same is in engagement with said lower extension rod and said pendulum when the same is in a vertical rest position substantially perpendicular to said axes of said rollers;

(b) displacing both said extension rods to respective second telescoped positions spaced a predetermined distance from said first telescoped positions, and repeating the measurement of step (a); and (c) calculating from the angles measured in steps (a) and (b) and from said predetermined distance the angular deviation, if any, of said roller axes from parallelism with each other.

2. In a device for determining the deviation, if any, of two respectively upper and lower cylindrical rollers from parallelism of their axes;

the improvement comprising that:

(a) said rollers at corresponding first ends thereof have each an axial telescoped extension rod which has a free end face and is axially displaceable relative to the associated one of said rollers;

(b) the upper extension rod carries at its free end face adjacent the perimeter thereof on a horizontal radius a pivot pin extending parallel to the axis of said upper roller; and (c) a gauging rod and a pendulum are vertically swingably supported on said pivot pin, with said pendulum being disposed farther from said free end face of said upper extension rod than said gauging rod;

(d) whereby said extension rods can be located in respective telescoped positions relative to said rollers, with said upper extension rod having its free end face spaced farther from said upper roller in the axial direction than said lower extension rod, to a degree permitting free swinging of said pendulum past said free end face of said lower extension rod but dictating tangential engagement of said gauging rod with the peripheral surface of said lower extension rod, to enable measurement of the angle included between said gauging rod when the same is in engagement with said lower extension rod and said pendulum when the same is in a vertical rest position substantially perpendicular to said axes of said rollers.

* * * * *